(12) United States Patent
Van Der Vleuten et al.

(10) Patent No.: US 6,731,808 B2
(45) Date of Patent: May 4, 2004

(54) COMPRESSED STORAGE OF DATA ITEMS

(75) Inventors: Renatus Josephus Van Der Vleuten, Eindhoven (NL); Richard Petrus Kleihorst, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 512 days.

(21) Appl. No.: 09/804,023

(22) Filed: Mar. 12, 2001

(65) Prior Publication Data

US 2001/0049778 A1 Dec. 6, 2001

(30) Foreign Application Priority Data

Mar. 13, 2000 (EP) .............................. 00200890

(51) Int. Cl.⁷ ................................ G06K 9/36
(52) U.S. Cl. ...................... 382/232; 382/233; 382/244; 382/305; 382/306; 345/600; 345/686; 345/472; 358/426.05; 358/523; 358/524
(58) Field of Search ................. 382/232, 233, 382/244, 305, 306; 345/600, 686, 472; 358/426.05, 523, 524

(56) References Cited

FOREIGN PATENT DOCUMENTS

EP 0999706 A2 11/1999

*Primary Examiner*—Donald Sparks
*Assistant Examiner*—Bao Q. Truong

(57) ABSTRACT

Storing of data items in a memory (31) is provided wherein the data items are divided into successive data pieces of decreasing significance, and the data pieces are stored in respective parts of the memory (31), and when applying a data piece to the memory (31) in case all candidate memory parts are assigned to other data pieces: if the significance of the applied data piece is lower than a lowest significance of the other data pieces, discarding the applied data piece; if the significance of the applied data piece is higher than the lowest significance, storing the applied data piece in one of the candidate memory parts at expense of a given other data piece which has a lower significance than the significance of the applied data piece. Advantageous use of the invention is made in applications using a device of fixed storage capacity for storing compressible data, such as video, images, audio, speech.

9 Claims, 1 Drawing Sheet

COMPRESSED STORAGE OF DATA ITEMS

Figure 1:
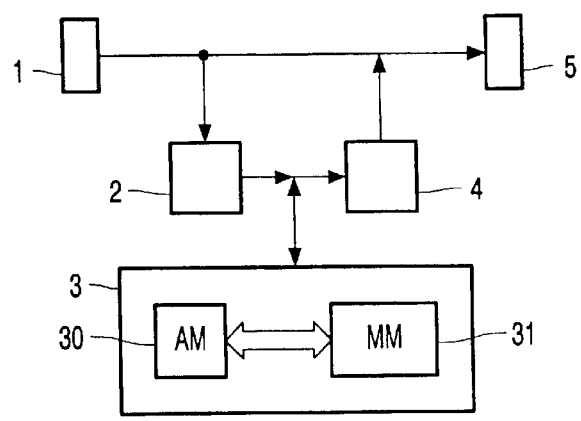

The invention relates to storing data items in a memory and to reading data items from a memory.

The invention further relates to a storage medium having stored thereon data items.

It is known to use a storage medium of fixed size to store multiple objects, which may be subjected to non-reversible (lossy) compression. Such applications include digital still cameras, where images are stored on a flash card, floppy disc or hard-drive. Further, video cameras are known in which multiple recordings are stored on a hard-drive, optical disc or tape. Also known are storage devices such as embedded memories, where it is desirable to minimize the total storage capacity used while still retaining a best possible image quality. Sometimes, a limited number of settings is available to the user to change the trade-off between quality and capacity. For example, video can be recorded in either 'standard play' or 'long play' mode, or snapshots can be taken at either 'standard resolution' or 'high resolution'. Once a decision has been made to use a certain quality, the decision cannot be changed afterwards, even in those cases where ample storage capacity is still available.

Cormac Herley discloses in $6^{th}$ International Conference on Image Processing (ICIP '99), vol. 3, Kobe, Japan, Oct. 24–28, 1999, storage of digital camera images. The camera is designed to store a fixed number of images, and a lossy rate controlled compression is used to ensure that each image fits in the space allocated to it.

An object of the invention is to provide a range of new features. To this end, the invention provides a method of and an arrangement for storing data items in a memory, a method of and an arrangement for reading data items from a memory, and a storage medium as defined in the independent claims. Advantageous embodiments are defined in the dependent claims.

A first embodiment of the invention comprises dividing each data item into successive data pieces of decreasing significance, storing the data pieces in respective parts of the memory, and when applying a data piece to the memory in case all candidate memory parts are assigned to other data pieces:

if the significance of the applied data piece is lower than a lowest significance of the other data pieces, discarding the applied data piece; or if the significance of the applied data piece is higher than the lowest significance of the other data pieces, storing the applied data piece in one of the candidate memory parts at expense of a given other data piece which has a lower significance than the significance of the applied data piece.

In a preferred embodiment of the invention, a record is kept for each data piece, the record comprising the significance of the data piece and the data item to which the data piece belongs. This record piece may be locally incorporated in a memory part, e.g. together with the data piece to which it belongs. Preferably, the record is kept in an auxiliary memory wherein each record further comprises a pointer which indicates a position in a main memory in which the data piece is stored.

The significance of a data piece is calculated according to a predetermined criterion. Preferably, the significance is calculated as a distortion difference.

Whenever a new data item is to be stored, it is preferably compressed by a scalable compression method in order to produce a scalable bit-stream. An advantageous method is described in non pre-published European patent application 99203839.8 dated Nov. 18, 1999 our reference PHN 17759). Such a scalable compression method has the property that the resulting scalable bit-stream may be cut off at any point, while the bits that remain in the scalable bit-stream give a best possible reconstruction quality for the given data item, given the number of bits available. When the scalable bit-stream is not cut off, the data item is encoded (near) losslessly, i.e. at a quality such that the reproduction is perceptually indistinguishable from the original. Scalable coding mechanisms are known for video and audio. In a preferred embodiment, the scalable bit-stream is cut into data pieces of the same sizes as the memory parts. Next, for each of these data pieces, a significance is calculated. Preferably, the significance is calculated as a distortion difference, which indicates an improvement in perceptual significance. The significance is used to compare the data pieces of the new item with the data pieces that are already stored. It can easily be understood that the data pieces produced by splitting the scalable bit-stream have the property of substantial decreasing significance, since the scalable coding methods first produce the most significant bits. The data pieces of a new item are then compared with the data pieces already present in the memory. When the new data pieces have a higher significance, previously stored data pieces are overwritten.

Although a scalable coding method is preferred, also a hierarchical coding method may be used.

The invention makes it feasible to store a variable number of data items in a fixed storage space. These data items are preferably multi-media objects, comprising audio objects, video objects, graphics objects etc. The data items are always stored with the best quality for a given amount of stored information. When an additional data item has to be stored, the quality (i.e. the amount of storage that is occupied) of the already stored data item is reduced enough to fit in the new data item, such that all data items will be stored at approximately the same quality.

Although in a preferred embodiment of the invention all memory parts have the same size, that is not required. The size of memory parts is chosen such that the storage capacity of multiple memory parts is usually required to store a single data item at a high quality. For example, a number of 8 storage data pieces is practical for storing an image.

In a preferred embodiment of the invention, a user is offered the possibility to store certain data items at higher quality than other data items.

These and other aspects of the invention will be apparent from and elucidated with reference to the accompanying drawings.

Figure 2:
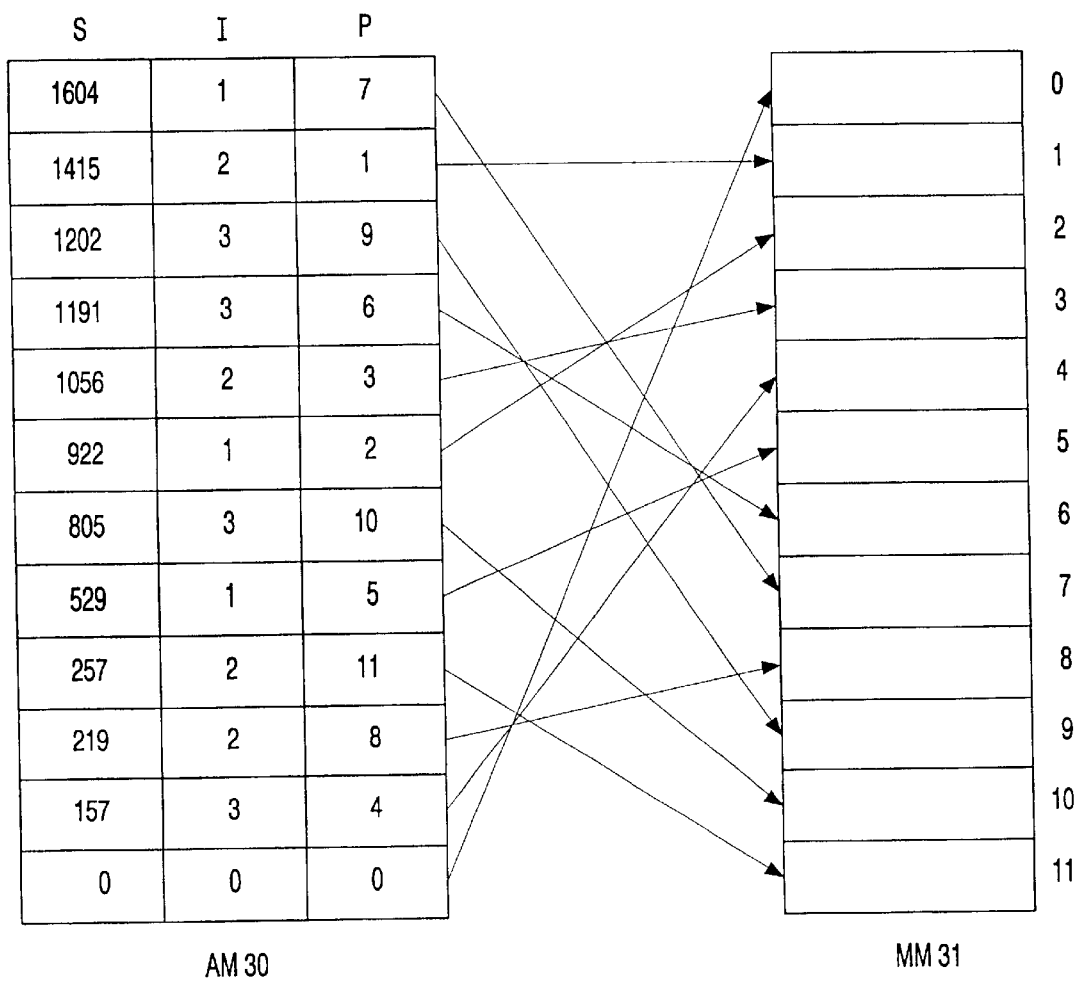

In the drawings:

FIG. 1 shows a schematic diagram of an arrangement wherein data items are stored according to the invention; and FIG. 2 shows a more detailed diagram of a part of the arrangement as shown in FIG. 1.

The drawings only show those elements that are necessary to understand the invention.

FIG. 1 shows an arrangement according to the invention, comprising an input unit 1, a scalable coder 2, a memory 3, a scalable decoder 4 and an output unit 5. The input unit 1 may be of any kind to obtain data, e.g an antenna, a camera or a storage medium. The data may be directly furnished to the output unit 5. The output unit 5 may be any kind of output unit, e.g. an antenna, a display or a storage medium. Before the data is furnished to the memory 3, the scalable coder 2 processes the data to obtain scalable bit-streams. The scalable bit-streams are then furnished to the memory 3. For retrieving data from the memory 3, a scalable decoder 4 is present which furnishes decoded data to the output unit 5 when desired. The memory 3 comprises an auxiliary memory (AM) 30 and a main memory (MM) 31. If necessary, some control or processing unit may be included in the memory 3 to control data flows.

In FIG. 2, the auxiliary memory 30 and the main memory 31 are shown in more detail, with an exemplary content. The main memory 31 is divided into N memory parts for storing N data pieces. In this example N=11. The auxiliary memory is typically smaller than the main memory and is used for administrative purposes. The auxiliary memory comprises N records, each record comprising several fields. A first field is a Pointer to Main Memory (P), which comprises a pointer to a location in the main memory 31 that holds the data associated with a given record. A second field is an Object Identifier (I) that comprises information describing the data item to which the data piece stored in the main memory belongs. The object identifier refers to, for example, an image out of a set of images stored by a digital camera. In a practical embodiment the object identifier is zero in case a memory part is not assigned to a data item, e.g. when the memory part is empty. A third field comprises a Significance (S). The S field gives a measure of the significance of the data piece stored in the main memory 31 where the record refers to. The entries in the significance fields are preferably non-negative numbers. The auxiliary memory 30 preferably has the property that the records are sorted on the significance. It is also possible to sort the records in a different manner, e.g. on the identifier to group all data pieces belonging to the same data item. Within the respective groups of data pieces, the data pieces may be sorted on significance.

To add a data item, the data item is coded in coder 2 to produce a scalable bit-stream, which is split in to data pieces. The pieces are subsequently processed. The significance measure of each piece is first compared to that of the block with the lowest significance measure currently in the memory. If the significance of the new data piece is lower, it is not stored in the main memory, i.e. it is discarded. When a first piece is not stored, the processing can be stopped because the further data pieces have lower significance than the current data piece (which is a property of a scalable coding mechanism). Further, a scalable bit-stream wherein a data piece is missing in the sequence is not decodable. If the significance is higher, the new data piece is written to the main memory 31 at the position of the current least significant data piece (which is obtained from the last position of the auxiliary memory in case the records are sorted on significance). Thereafter, the last record of the auxiliary memory is replaced by the record data for the new data piece and the records in the auxiliary memory 30 are re-ordered to restore the ordering on significance. It is advantageous to start processing with the most significant data piece of an item (and then with the subsequent data pieces having lower significance), because this is the order in which the data pieces are produced by the scalable coder 2, and further because these data pieces are not overwritten by blocks belonging to the same item since these are less significant.

To extract a data item, the records in the auxiliary memory 30 are subsequently processed and if the object identifier matches that of the data item to be extracted, the data piece in the main memory 31 pointed to by the record is sent to the scalable decoder 4. Since the auxiliary memory is traversed starting at the highest significance, the data pieces will be extracted at the right order, allowing the decoder 4 to form a progressively better reconstruction.

To delete a data item, the records in the auxiliary memory 30 are subsequently processed and if the object identifier matches that of the data item to be deleted, the significance of the record is set to a (predetermined) value that is lower than any value that can be produced by the encoder, e.g. zero. Preferably, also the identifier is set to a predetermined value, e.g. zero to indicate that the memory part is not assigned to a data piece. The records in the auxiliary memory 30 are then re-ordered to restore the ordering on significance, i.e. such that the records of the lowest significance are placed at the end.

The use of an auxiliary memory 30 is preferred. However, it is also possible to omit the auxiliary memory. In that case the significance of a data piece and an identifier to which data item it belongs should be stored in the main memory. Because pointers to data pieces in order of significance are in this case not available, searching the main memory 31 takes more time. To reduce searching, the data pieces may be sorted in the main memory, at the cost of switching much larger amounts of data. Also a Content Addressable Memory can be used to implement the auxiliary memory, eliminating the need for sorting and searching in the auxiliary memory by a separate processor. Furthermore, more advanced data structures such as heaps or trees, which are generally known, may be used for performing the administrative functions, as an alternative to the preferred auxiliary memory data structure. These alternatives could be advantageous for example in a software implementation (or hardware when sufficient clock cycles are available), especially for a large number of memory parts.

In a preferred embodiment of the invention, some additional information is stored for each data item. The additional information may include name, type of information, color, size, etc. This additional information may be stored in the main memory, e.g. together with the first data piece. Preferably, the additional information is stored in the auxiliary memory, which makes it easier to retrieve this additional information.

In the following, a preferred computation of a significance is discussed. According to rate-distortion theory, as well as to scalable coding practice, one first has to send/store those bits that have the largest impact on reducing the distortion in the reproduction made by the decoder. The distortion measure that is used, depends on the application; e.g. one would typically use different measures for video and audio. However, all these distortion measures have in common that they correspond in some way to the quality of the video/audio object as perceived by the consumer during the reproduction. Our definition of this measure is independent of the particular application. Given any distortion measure that can be computed by the encoder, the significance can be formally defined as:

$$M_{i,k} = \frac{D_{i,k-1} D_{i,k}}{R_{i,k} - R_{i,k-1}} \tag{1}$$

where the index i refers to a given object and the index k indicates the number of encoded blocks that are available at the decoder. $D_{i,k-1}$ thus represents a distortion in the reproduction when k−1 subsequent blocks have been received and $D_{i,k}$ represents the distortion in the reproduction after k blocks have been received. $R_{i,k-1}$ represents a rate, i.e. the total number of bits used, for k−1 subsequent blocks and $R_{i,k}$ represents the number of bits used for k blocks. $D_{i,0}$ is the initial distortion at the decoder when no bits have been transmitted and $R_{i,0}$ is the number of bits when no bits have been sent, i.e. $R_{i,0}$=0. When all blocks in the main memory have the same size, division by block size is a constant division and is preferably left out:

$$\tilde{M}_{i,k} = D_{i,k-1} - D_{i,k} \quad (2)$$

An example of a distortion measure, which is often used in images/video, is the quadratic error measure, which is the sum of the squared pixel value differences between an original image and its reproduction. After encoding block k, the encoder, in principle, has to recompute the error for each pixel of the image in order to obtain $D_k$, but in practice some simplifications/shortcuts of this computation are usually possible.

In a practical embodiment, the significance of a first data piece of a data item is adapted in that a distortion after reception of the first data piece is stored rather than the distortion reduction. This provides the possibility to calculate the absolute distortion of each data item more precisely without needing the original data item. Further, a number is added to the distortion after reception to make sure that the first data piece of a data item can normally not be overwritten. This has the advantage that for each data item, one data piece normally always remains in the memory, which data piece makes it possible to make a rough representation of the data item.

As already mentioned, the invention preferably stores data items that have been scalably encoded. Ideally, any subsequent block in a scalable bit-stream has a lower distortion reduction which is advantageous in the implementation of the invention. However, not all scalable coders have an ideal behavior. Therefore, a practical embodiment of the invention checks if the distortion reduction is indeed lower for subsequent data pieces. It is important that the data pieces are available in a right sequence, because the data items can only be decoded in a proper way if the data pieces are available in the right sequence and no data pieces are missing (truncate at end only). In an embodiment according to the invention, a pointer is used, which indicates the right sequence of the data pieces. In a preferred embodiment, the invention recognizes that when the distortion difference in a subsequent data piece is not smaller, that it, in general, deviates in a small amount from the distortion difference from a previous data piece. If in the sequence of data pieces of a scalably coded data item, data pieces are present which do not have a strictly decreasing distortion difference, they are adjusted in a way as described in the following. First, the number of problem data pieces n, which do not have a strictly decreasing distortion difference is determined. For example a data piece k+1 has a significance value of 2950 and a data piece k has a significance value of 2947. The number of problem pieces is in this example 2. Second, the average value of the perceptual significance is determined (rounded to an integer value), i.e. 2949 in this example. Third, new significances are assigned to the problem data pieces starting with the average value 2949 decreased with n/2 for the last data piece, i.e. 2948 for data piece k+1, the value of the preceding data piece k being incremented by one, i.e. 2949 and so on. This adjustment has the advantage that the order in the memory is the right order of the data pieces, such that a decoder gets the data pieces in the right order. The total distortion difference remains about equal to the non-adjusted sequence and the deviation with regard to the real significance is minimized.

It is possible to jointly store different types of objects, e.g. both audio and video, in the memory, using appropriately weighted perceptual significance measures and/or appropriately selected block sizes.

Advantageous use of the invention is made in applications using a device of fixed storage capacity for storing compressible data, such as video, images, audio, speech, etc. in which an unknown/variable amount of data has to be stored and/or for each amount of stored data the highest possible data quality is desired at all times.

Examples of advantageous embodiments are:

Digital Still Camera. A first picture may be stored at very high quality. Subsequent pictures are stored in the fixed memory, while replacing some of the data of the previous pictures. Depending on the total number of pictures in the memory, a certain quality of the pictures is achieved. The more pictures, the lower the average quality. In a doorbell application, a picture may be taken every time someone pushes a button of a doorbell.

Answering Machine/Voice Mail. An audio data item is stored for each person that calls and leaves a message. In case the memory is completely used, new audio items may be stored by reducing the quality of the already stored audio items.

Video Recorder. A new feature offered in a video recorder is, e.g., variable recording time. One application thereof is the ability to store more relevant programs in a lower quality instead of not recording a program because a storage capacity of a tape or disc is entirely used.

Picture-In-Picture (PIP) Replay. A user indicates the duration of a PIP Replay of a certain program, e.g. by pressing a button while watching TV. Because a given PIP-memory has a fixed capacity, the user may exchange quality and duration of the PIP Replay.

Buffer control for embedded image memory. The whole image is subdivided into parts that are individually coded using a scalable coding technique. The individual parts are then split up into blocks and put into the main memory. The advantage of this new approach is that a smaller memory is required for the same image quality or a better image quality is obtained for the same memory size. [The traditional approach is to first encode (and store) the whole image, before combining the individual parts. Alternatively, a fixed number of bits is assigned to each part of the image, but this is a sub-optimal approach.]

All these embodiments are preferably provided with some kind of quality indicator to the user.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, storing of data items in a memory is provided wherein the data items are divided into successive data pieces of decreasing significance, and the data pieces are stored in respective parts of the memory, and when applying a data piece to the memory in case all candidate memory parts are assigned to other data pieces: if the significance of the applied data piece is lower than a lowest significance of the other data pieces, discarding the applied data piece; if the significance of the applied data piece is higher than the lowest significance, storing the applied data piece in one of the candidate memory parts at expense of a given other data piece which has a lower significance than the significance of the applied data piece. Preferably for each data piece a record is kept comprising a significance of the data piece and the data item to which the data piece belongs. The data items are preferably coded by a scalable coding mechanism. The scalable bit-stream is cut into data pieces of the same sizes as those available in the memory. Next, for each of these smaller pieces, a significance value is calculated. The significance may be calculated as a distortion difference. The significance is used to compare the data pieces of the new item with the data pieces that are already stored. It can easily be understood that the data pieces produced by splitting the scalable bit-stream have the property of decreasing significance, since the scalable coding methods first produce the most significant bits. The data pieces of a new item are than compared to the data pieces already present in the memory. When the new data pieces have a higher significance, previously stored data pieces are overwritten. Advantageous use of the invention is made in applications using a device of fixed storage capacity for storing compressible data, such as video, images, audio, speech.

What is claimed is:

1. A method of storing data items in a memory (3), the method comprising the steps of:

dividing each data item into successive data pieces of decreasing significance;

storing the data pieces in respective parts of the memory (31); and when applying a data piece to the memory (31) in case all candidate memory parts are assigned to other data pieces:

if the significance of the applied data piece is lower than a lowest significance of the other data pieces, discarding the applied data piece; or if the significance of the applied data piece is higher than the lowest significance of the other data pieces, storing the applied data piece in one of the candidate memory parts at expense of a given other data piece which has a lower significance than the significance of the applied data piece.

2. A method as claimed in claim 1, wherein for each data piece a record (30) is kept, comprising the significance (S) of the data piece and the data item (I) to which the data piece belongs.

3. A method as claimed in claim 2, wherein the data items are stored in a main memory (31) and the record is kept in an auxiliary memory (30), each record further comprising a pointer (P) which indicates a position in the main memory (31) in which a given data piece is stored.

4. A method as claimed in claim 1, wherein the significance of a data piece is calculated on base of a distortion difference.

5. A method as claimed in claim 1, wherein the data items have been scalably coded (2).

6. A method of reading data items from a memory (3), which data items have been divided into successive data pieces of decreasing significance, which data pieces have been stored in respective memory parts (31) by discarding a data piece if the significance of the data piece is lower than a lowest significance of other data pieces or storing a data piece at expense of another data piece that has a lower significance than the significance of the data piece if the significance of the data piece is higher than the lowest significance of the other data pieces, wherein an indication of the significance of each data piece is available in the memory, the method comprising the steps of:

reading for each data item the successive data pieces from the memory (31), which data pieces belong to said data item; and constructing (4) the data item from the successive data pieces.

7. An arrangement for storing data items in a memory (3), the arrangement comprising:

means for dividing each data item into successive data pieces of decreasing significance;

means for storing, the data pieces in respective parts of the memory (31); and means for applying a data piece to the memory (31), which means are arranged for, in case all candidate memory parts are assigned to other data pieces, discarding the applied data piece if the significance of the applied data piece is lower than a lowest significance of the other data pieces; or storing the applied data piece in one of the candidate memory parts at expense of a given other data piece that has a lower significance than the significance of the applied data piece if the significance of the applied data piece is higher than the lowest significance of the other data pieces.

8. An arrangement for reading data items from a memory, which data items have been divided into successive data pieces of decreasing significance, which data pieces have been stored in respective memory parts (31) by discarding a data piece if the significance of the data piece is lower than a lowest significance of other data pieces or storing a data piece at expense of another data piece that has a lower significance than the significance of the data piece if the significance of the data piece is higher than the lowest significance of the other data pieces, wherein an indication of the significance of each data piece is available in the memory, the arrangement comprising:

means for reading for each data item the successive data pieces from the memory (31), which data pieces belong to said data item; and means for constructing (4) the data item from the successive data pieces.

9. A storage medium (3) having stored thereon data items for access by an output unit, which data items have been divided into successive data pieces of decreasing significance, which data pieces have been stored in respective memory parts (31) by discarding a data piece if the significance of the data piece is lower than a lowest significance of other data pieces or storing a data piece at expense of another data piece that has a lower significance than the significance of the data piece if the significance of the data piece is higher than the lowest significance of the other data pieces, wherein an indication of the significance of each data piece is available on the storage medium enabling the data pieces to be retrieved according to the significance.

\* \* \* \* \*